United States Patent [19]

Donaghue, Jr. et al.

[11] Patent Number: 5,467,391
[45] Date of Patent: Nov. 14, 1995

[54] INTEGRATED INTELLIGENT CALL BLENDING

[75] Inventors: Norman J. Donaghue, Jr., Renton; Clinton J. Hurd, Poulsbo; David C. Mullen, Renton, all of Wash.

[73] Assignee: Digital Systems International, Inc., Redmond, Wash.

[21] Appl. No.: 276,774

[22] Filed: Jul. 14, 1994

Related U.S. Application Data

[63] Continuation of Ser. No. 964,600, Oct. 21, 1992, abandoned.

[51] Int. Cl.$^6$ ............................. H04M 3/00; H04M 5/06
[52] U.S. Cl. ................................. 379/265; 379/266
[58] Field of Search ........................... 379/76, 92, 112, 379/113, 132, 133, 134, 135, 136, 265, 266, 309

[56] References Cited

U.S. PATENT DOCUMENTS

| | | | |
|---|---|---|---|
| 3,643,034 | 2/1972 | Burns et al. | 379/266 |
| 4,797,911 | 1/1989 | Szlam et al. | 379/67 |
| 4,829,563 | 5/1989 | Crockett et al. | 379/309 |
| 4,837,799 | 6/1989 | Prohs et al. | 379/269 |
| 4,881,261 | 11/1989 | Oliphant et al. | 379/215 |
| 4,894,857 | 1/1990 | Szlam et al. | 379/92 |
| 4,896,345 | 1/1990 | Thorne | 379/266 |
| 5,155,763 | 10/1992 | Bigus et al. | 379/113 |
| 5,214,688 | 5/1992 | Szlam et al. | 379/67 |
| 5,247,569 | 9/1993 | Cave | 379/266 X |
| 5,309,505 | 5/1994 | Szlam et al. | 379/266 X |

FOREIGN PATENT DOCUMENTS

| | | |
|---|---|---|
| 2041882 | 12/1991 | Canada. |
| 0340665 | 11/1989 | European Pat. Off.. |

*Primary Examiner*—Jeffery A. Hofsass
*Assistant Examiner*—Daniel Hunter
*Attorney, Agent, or Firm*—Seed and Berry

[57] ABSTRACT

A system and method for sharing a pool of agents in a telephone call servicing operation so that agents are utilized effectively. The telephones of a pool of agents are coupled to a number of dedicated inbound communication lines through an automatic call distributor (ACD). The telephones of another pool of agents is coupled to a number of dedicated outbound communication lines through an outbound dialer. The outbound agent telephones may be directly coupled to the outbound dialer, or may be coupled to the outbound dialer through the ACD. Alternatively, the agents may be in a single pool and all be available for servicing inbound and outbound calls. Agents are acquired from inbound call servicing to service outbound calls when the agent response indicator for inbound calls is below a predetermined threshold. Agents are acquired for outbound calling by placing an internal call from the outbound dialer through the ACD to an agent. An acquired agent is released by terminating the internal call, not the individual outbound calls handled by the acquired agent.

36 Claims, 8 Drawing Sheets

INTEGRATED INTELLIGENT CALL BLENDING

CROSS-REFERENCE TO RELATED APPLICATION

This is a continuation of U.S. patent application Ser. No. 07/964,600, filed Oct. 21, 1992, now abandoned.

TECHNICAL FIELD

This invention relates generally to the field of automatic call distribution. More specifically, it relates to a method for controlling performance of a pool of personnel for optimum performance of both inbound and outbound call servicing.

BACKGROUND OF THE INVENTION

Historically, large telephone service operations, such as customer service centers, separate inbound calling and outbound calling as separate operations. Each operation is governed by its own set of operational rules and objectives. Inbound calls are typically handled by a stand-alone automatic call distributor (ACD). The goal of the inbound call servicing operation is to provide optimum response, which is usually defined as the speed of response to an arriving call by an operator or agent. This is measured by the average speed Of answer (ASA). Other service quality definitions, such as abandonment rate, may be used. The abandonment rate indicates the number of customers who hang up while on hold.

The arrival rate of inbound call traffic is generally assumed to be a random process with a Poisson distribution based on the average arrival rate. The Poisson arrival process assumes that the arrival time of any one particular call is independent of the arrival time of any other call. From these statistics, a manual forecast of agent requirements is made based on the Erlang-C model. This is normally used in an inbound calling environment to schedule agents. Matching these agents' schedules to the random arrival rate of inbound calls is a source of inefficiency in the inbound call operation. If a large number of agents relative to the expected traffic is scheduled, the utilization of these agents will be low, although the quality of service to the caller will be high. If a small number of operators relative to the expected traffic is scheduled, the ASA will be poor, although the agent utilization will be high.

The arrival rate of inbound call traffic is further complicated by variations in traffic rate which are not addressed by the Erlang-C model. Such variations can be due to unexplained causes and consequently cannot be forecasted. This leads to large mismatches between actual traffic levels and staffing levels in spite of diligent efforts to match staffing with expected traffic levels. The mismatches between inbound call traffic and staffing cannot be completely eliminated by staff planning efforts. The result is rampant chronic overstaffing, resulting in poor agent utilization, or understaffing, resulting in poor customer service in inbound calling operations.

Outbound calls are typically handled by a stand-alone outbound dialer. Its goal is to maximize agent utilization by maximizing the number of valid telephone connections for a given population of agents and distribution of call characteristics. The connection rate of outbound traffic is controlled by the outbound dialer. Unlike the inbound call servicing operation, the outbound call servicing operation is not random. The connection rate can be adjusted to accommodate the pool of available agents. Because the inbound and outbound call servicing operations have different operational rules and objectives, they are treated as separate operations despite the inefficiency in agent utilization.

Therefore, it can be appreciated that a need exists to combine the pool of agents available to service inbound calls with the pool of agents available to service outbound calls so as to optimize agent efficiency while maintaining service quality in both inbound and outbound call servicing operations.

SUMMARY OF THE INVENTION

A system and method of sharing a pool of agents coupled to a telephone exchange through a plurality of dedicated inbound communications and dedicated outbound communication lines. An automatic call distributor receives calls from the dedicated inbound communication lines and routes them to the telephones of available inbound agents in an agent pool. Other agents may be designated as outbound agents and have telephones which are coupled through an outbound dialer to the dedicated outbound communication lines. A third pool of agents may be designated to handle both inbound and outbound calls. The agents in the third pool may initially service inbound calls, but may be acquired to service outbound calls by having the outbound dialer place a call through the automatic call distributor to an agent in the third agent pool. When an agent in the third pool is so acquired, the agent may service a plurality of outbound telephone calls. The acquired agent continues to be coupled to the outbound dialer through the automatic call distributor as long as the acquired agent is servicing outbound calls. Acquired agents are released by terminating the acquisition call. When an acquired agent in the third agent pool is released, the agent returns to servicing inbound calls. Alternatively, agents may be acquired or released by sending commands to the automatic call distributor.

In an alternative embodiment, all agents are placed in a single agent pool, and agents are acquired by having the outbound dialer place an internal call through the automatic call distributor to the agent to be acquired. In another alternative embodiment, agents may be acquired and released from different call operations. Agents may be acquired and released from alternative service tasks besides outbound call servicing.

DETAILED DESCRIPTION OF THE INVENTION

Prior art systems treat the inbound and outbound call servicing operations independently. To predict the number of operators or agents required for inbound call servicing, prior art systems use a call profile based on historical call volume data. For example, the call profile may indicate that 1,200 calls per hour is the average inbound call volume for a Monday, while there are only 750 calls per hour on a Tuesday. Supervisors manually examine the call profile and attempt to schedule the proper number of agents so that agent utilization is optimized and so that incoming calls are serviced satisfactorily. Agent scheduling is frequently done in fifteen-minute intervals, based on the call profile, in an attempt to schedule the proper number of agents.

Figure 1:
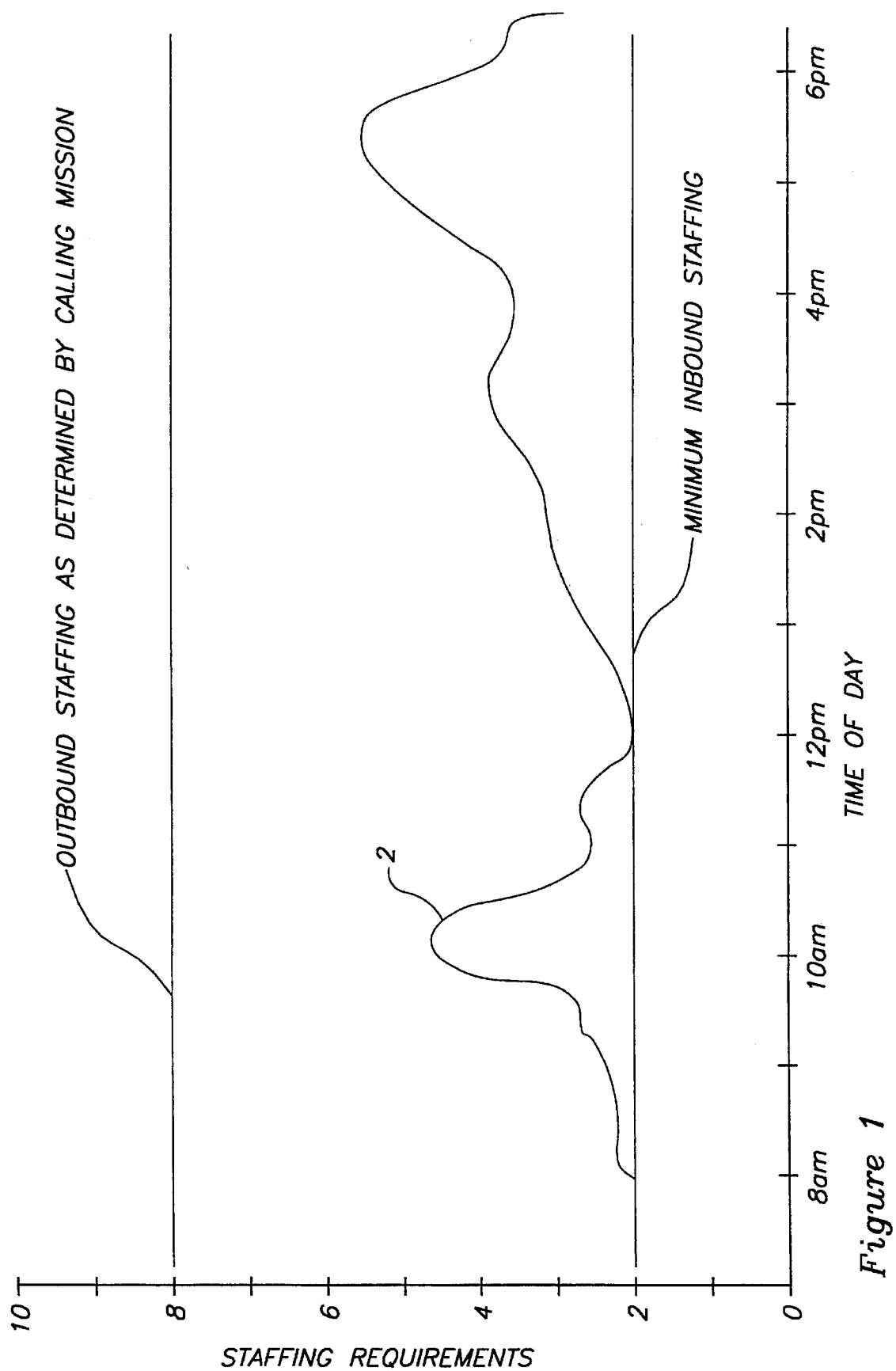
FIG. 1 is a graph illustrating an example of agent staffing requirements.

In contrast, the present invention allows a pool of agents to be designated as inbound-only agents to service inbound calls. The number of inbound-only agents required may typically be determined by the minimum inbound call volume so that agent utilization or productivity is maximized. In the example of FIG. 1, the actual inbound call volume shown by line 2 fluctuates throughout the day, but requires two inbound-only agents to service the minimum inbound call volume. The peak periods of inbound call volume require from four to six agents. The staffing requirements for the outbound calling mission is dependent on the particular mission. In this example, the outbound calling mission requires eight outbound agents. In accordance with one aspect of the present invention, some of the outbound agents are used to service inbound calls during the periods of peak inbound call volume. Since two agents are designated as inbound-only agents, from two to four outbound agents are required during the peak periods to meet the staffing requirements of inbound call servicing. If the inbound call servicing is staffed with more than the minimum number of inbound-only agents, the agents will have decreased productivity during periods of low inbound call volume.

The present invention uses some outbound agents to meet the temporary staffing requirements of inbound call servicing. The agents that may be automatically switched between inbound and outbound call servicing are referred to as blend agents. In the present example, four of the eight outbound agents are designated as blend agents. The remaining agents are designated as outbound-only agents. Alternatively, more than four agents may be designated as blend agents. Thus, the present example shown in FIG. 1 requires a total of ten agents, with two being designated as inbound-only agents, four or more as blend agents and the remaining agents being designated as outbound-only agents. It is clear that the staffing requirements shown in FIG. 1 are examples only, and that the actual staffing requirements are dictated by the individual requirements of the call servicing operation.

By using blend agents with dynamic allocation between inbound and outbound operations, many of the problems of the prior art are solved. Overstaffing and understaffing can be eliminated by adapting quickly to the inbound traffic demands on the system. With sufficient blend agents there is no need to accurately forecast the call traffic as the present invention, via acquisition and release of blend agents, causes the calling operation to ride the traffic demand curve without a priori statistics on the curve. The current invention eliminates forecasting errors due to uncontrolled or unexplained factors and it also compensates for randomness. The system of the present invention adjusts to changes in call statistics as they happen over short time intervals. The inbound-only agent requirements may be determined by the minimum inbound call volume. The required number of blend agents may be determined by the peak inbound call volume. The number of outbound agents is determined by the specific outbound calling mission.

Typically, inbound calls will be transaction-oriented calls related to the primary application assigned to the agent pool. The arrival rate of these calls, although predictable over the long term, is random and highly variable in the short term. In contrast, the rate of outbound calling is highly predictable and can be altered, depending on such factors as the number of agents available to service outbound calls, the average duration of a call, and time required by an agent to process data after termination of an outbound call. To assure a high-quality level of service for the inbound call servicing operation, prior art systems require a large pool of agents. During peak periods of inbound call volume, this large pool of agents is required to ensure that an agent will be available quickly to answer the inbound calls. The utilization of these agents, averaged over both the peak and non-peak periods, tends to be low. The present invention decreases overall staffing requirements and increases agent utilization by decreasing the number of inbound-only agents required and using blend agents to service inbound calls during periods of peak inbound call volume. Or, conversely, the present invention decreases overall staffing requirements and increases agent utilization by decreasing the number of outbound-only agents required and using blend agents to service outbound calls during lulls in inbound calling. The present invention increases overall call quality by using blend agents to service inbound calls during periods of peak inbound call volume and outbound calls during lulls in inbound calling. To effectively use blend agents, the present invention monitors all inbound and outbound calls to determine the status of all agents at all times.

Figure 2:
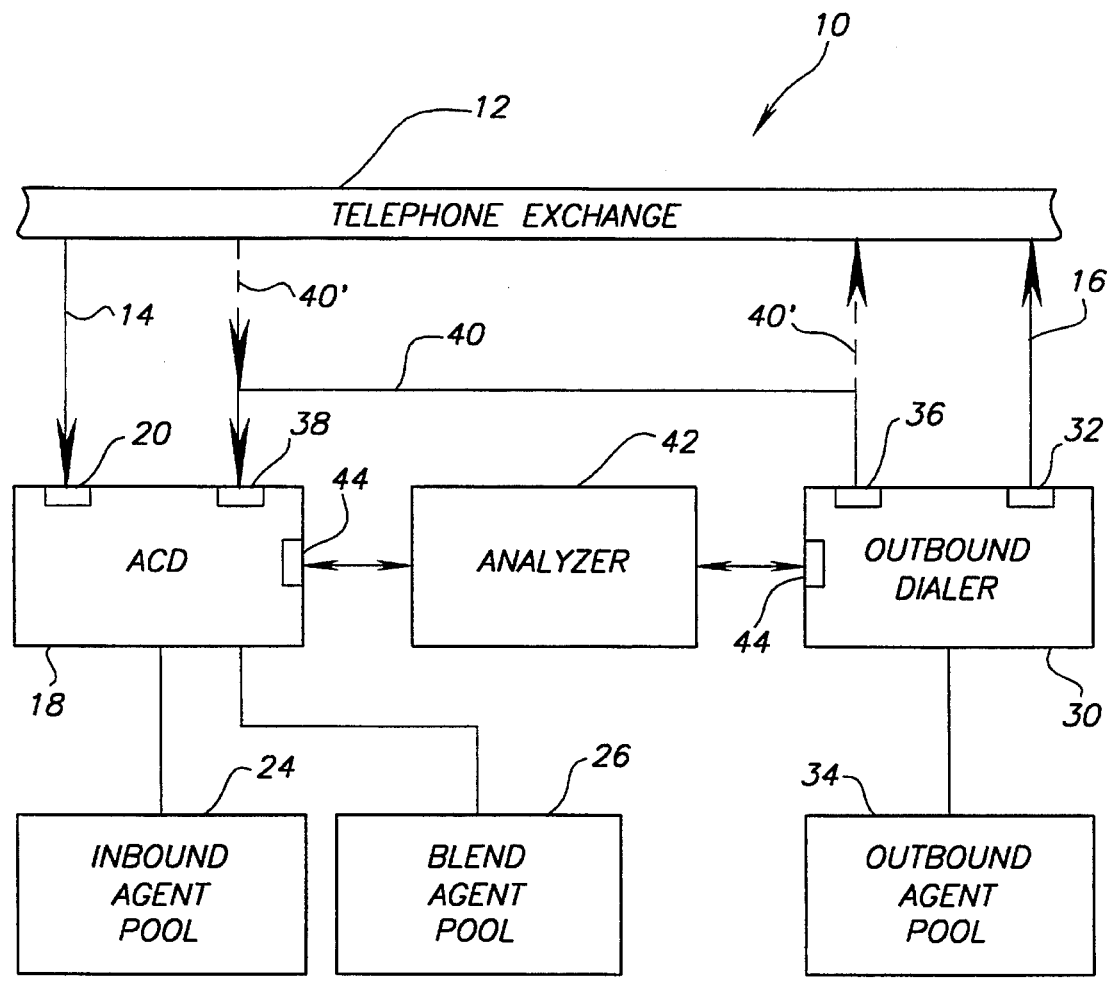
FIG. 2 is a functional block diagram of a system incorporating the present invention.

As illustrated in FIG. 2, the present invention is embodied in a system, referred to generally by reference numeral 10, which allows agents to be switched between inbound and outbound call servicing operations and from one call servicing operation to an unrelated call servicing operation or even to a related or non-related non-calling service operation so as to maximize agent utilization while simultaneously maintaining the quality of inbound call servicing. The system 10 can be configured to operate effectively with premises equipment or central office equipment. These terms, which are well known in the art, refer to equipment that is installed on the user's premises or installed in a central office and coupled to the user's premises via a communication link. For the purposes of this application, blend agents are "acquired" from servicing inbound telephone calls to service outbound telephone calls during non-peak periods of inbound call volume. As inbound call volume increases, an acquired agent is "released" to return to servicing inbound telephone calls. This terminology should not be considered a limitation, since it is clear that blend agents could initially be assigned to service outbound telephone calls and be acquired to service inbound telephone calls during periods of peak inbound call volume. In both situations, the system 10 maximizes productivity by sharing a pool of agents who handle inbound and outbound telephone calls. Because this invention relates to a telephone switching apparatus, it is apparent that the term "connecting an agent to a call" refers to connecting the agent's telephone device and not the agents themselves. Each agent in the system 10 may have one or more telephone devices.

As shown in FIG. 2, the system 10 uses a telephone exchange 12. As used herein, a telephone exchange includes any network capable of routing calls, such as a Local Exchange Carrier (LEC), an Interchange Carrier (IXC), a Private Branch Exchange (PBX), a Centrex facility, or any public or private telephone network. In the present embodiment, the telephone exchange has a plurality of trunk lines. A number of the trunk lines are designated as dedicated inbound communication lines 14, and the remaining trunk lines are designated as dedicated outbound communication lines 16. As used herein, "dedicated inbound" means the communications lines are dedicated to receiving inbound telephone calls, and "dedicated outbound" means the communication lines are dedicated to outbound calling. The overall number of trunk lines required for a specific installation and the designation of trunk lines as dedicated inbound communication lines 14 and dedicated outbound communication lines 16 varies from one installation to another.

A stand-alone automatic call distributor (ACD) 18 is coupled to the dedicated inbound communication lines 14 through a first distribution network connection 20 coupling the ACD to the dedicated inbound communication lines. The ACD typically uses the incoming directory number to identify the type of service required by the call. In other words, the ACD 18 knows the type of service required by the caller because of the telephone number of the particular communication line that the ACD answers. For example, the directory number 555-1234 may be a telephone number for billing inquiries, while the directory number 555-1235 may be a customer service number. The ACD 18 may use this directory number to select an agent from the appropriate agent pool provided for the particular service. The agent pool, sometimes known as a split, may subdivide the total agent pool into subgroups which may be allocated to different tasks, such as customer service, customer ordering, or the like. A large call service center may allocate different agent pools to service different clients.

The agents available to be acquired may be a part of an inbound agent pool 24 or may be allocated to a separate agent pool, which for the purposes of this application may be termed a blend agent pool 26. A blend agent is acquired from the blend agent pool 26 in a unique manner as described below.

The system 10 of FIG. 2 places outbound telephone calls using a stand-alone outbound dialer 30. The outbound dialer 30 has a first dialer network connection 32 coupling the outbound dialer to the dedicated outbound communication lines 16. When the outbound dialer 30 makes a successful connection to a customer, the particular communication line is coupled through the outbound dialer 30 to the telephone device (not shown) of an agent in an outbound agent pool 34 designated to service outbound calls. Because the dialing and successful connection rates for outbound dialers are both controllable and predictable, the utilization of agents in the outbound agent pool 34 can be very high. Numerous algorithms in the prior art may be used to set the rate of outbound dialing by the outbound dialer 30. The system 10 adjusts the outbound dialing rate as blend agents are acquired to assist in servicing outbound calls or released to assist in servicing inbound calls.

In accordance with another aspect of the present invention, to place internal agent acquisition telephone calls to acquire a blend agent for outbound call servicing, the outbound dialer 30 has a second dialer network connection 36 coupling the outbound dialer to a second distributor network connection 38 of the ACD 18. A plurality of internal communications trunk lines 40 connect the second dialer network connection 36 with the second distributor network connection 38. When the utilization of agents servicing inbound calls is low, the outbound dialer 30 places a call through one of the internal communications trunk lines 40 to the ACD 18 through the second distributor network connection 38. The ACD 18 then directs the internal call to a desired blend agent from the blend agent pool 26. The ACD 18 couples the blend agent acquired from the blend agent pool 26 to the outbound dialer 30 through the ACD 18 and the internal communications trunk line 40. Under typical circumstances, an acquired blend agent from the blend agent pool 26 is used to service a plurality of outbound calls and only outbound calls during the period when the agent is acquired to service outbound calls. The internal communications trunk line 40 coupling the acquired blend agent through the ACD 18 to the outbound dialer 30 is maintained through these plurality of outbound calls.

Note that the term internal trunk lines 40 may refer to trunk lines that are physically located within the call servicing physical plant and directly couple the ACD 18 with the outbound dialer 30. However, the present invention is not limited only to call servicing operation in which the agents are physically located within a single facility. Nor is the term "internal trunk lines" limited only to communications lines within a single facility. The means for implementing the telephone connection could be any commonly available telephone circuit provided by a private or public network. The term internal trunk lines refers to communications lines that are used within the system 10 to acquire or release an agent. As indicated by the dashed line, the internal trunk lines 40' may be part of the telephone exchange 12. This arrangement allows an agent to be coupled to the system 10 anywhere in the world where there is a telephone exchange 12. For example, an agent may be part of a call servicing operation in one location, such as the agent's home, and coupled to the system 10 in a separate location through the telephone exchange 12. The agent operating at home may be part of the inbound call servicing and is coupled to the system 10 through the ACD 18. The agent at home may be acquired for outbound call servicing by having the system 10 place an internal agent acquisition call through the internal trunk lines 40' to couple the agent at home to the outbound dialer 30 to service outbound calls. The internal trunk lines 40' may be coupled to the telephone exchange 12 through the network connections 36 and 38, or may be coupled to the telephone exchange 12 through the network connections 32 and 20, and the dedicated outbound communications lines 16 and the dedicated inbound communications lines 14.

Alternatively, the ACD 18 of some manufacturers allow the acquisition and release of an agent through the use of commands to the ACD 18. For example, the AT&T model DEFINITY GENERIC 3 ACD allows the system 10 to log agents off of inbound call servicing and log on to outbound call servicing without the need for agent acquisition calls. These acquisition and release commands are sent to the ACD 18 by the analyzer 42, based on the determinations described in detail below. Thus, the present invention can be used with ACDs 18 requiring the acquisition and release of agent by placing acquisition calls, and with ACDs 18 requiring acquisition and release commands sent directly to the ACD to acquire and release an agent.

In one embodiment of the invention, if the utilization of agents from the inbound agent pool 24, and the blend agent pool 26 for blend agents that are still servicing inbound calls, becomes high and the ASA increases beyond a predetermined upper threshold speed, the acquired blend agent may be returned to servicing inbound calls by terminating the internal communication link between the ACD 18 and the outbound dialer 30. In other words, the internal call is terminated. It should be obvious to one skilled in the art that other performance criteria could just as easily be used. Upon termination of the internal communication link, the acquired blend agent is released and is available to service inbound calls. As blend agents are acquired and released, the outbound dialer 30 adjusts the rate of outbound dialing to compensate for the fluctuation in the number of agents in the blend agent pool 26 and the outbound agent pool 34 available for outbound call servicing.

An analyzer 42 is used to monitor inbound calls and outbound calls and compile a set of statistics related to both inbound and outbound calls. The set of statistics, which are used to determine the level of service quality for both inbound and outbound call servicing, as well as the performance and utilization of agents, will be discussed in detail below. The analyzer 42 determines whether an agent should be acquired or released. The analyzer also causes the outbound dialer 30 to adjust the rate of outbound dialing depending on the number of agents available to service outbound calls. The analyzer 42 may be part of the ACD 18, the outbound dialer 30 or may be an independent unit. The status of agents in the various agent pools 24, 26 and 34 may be monitored through a conventional device known as a switch to computer application interface (SCAI) 44, which may also be called a Computer-Telephone Integration (CTI) link. The SCAI 44 continuously monitors the status of all incoming calls, outbound calls, and the status of agents in the various agent pools 24, 26, and 34. As should be obvious to one skilled in the art, other means may be used for monitoring inbound and outbound calls to gather information for processing in the analyzer, such as Call management System, a standard feature of most ACDs.

Figure 3:
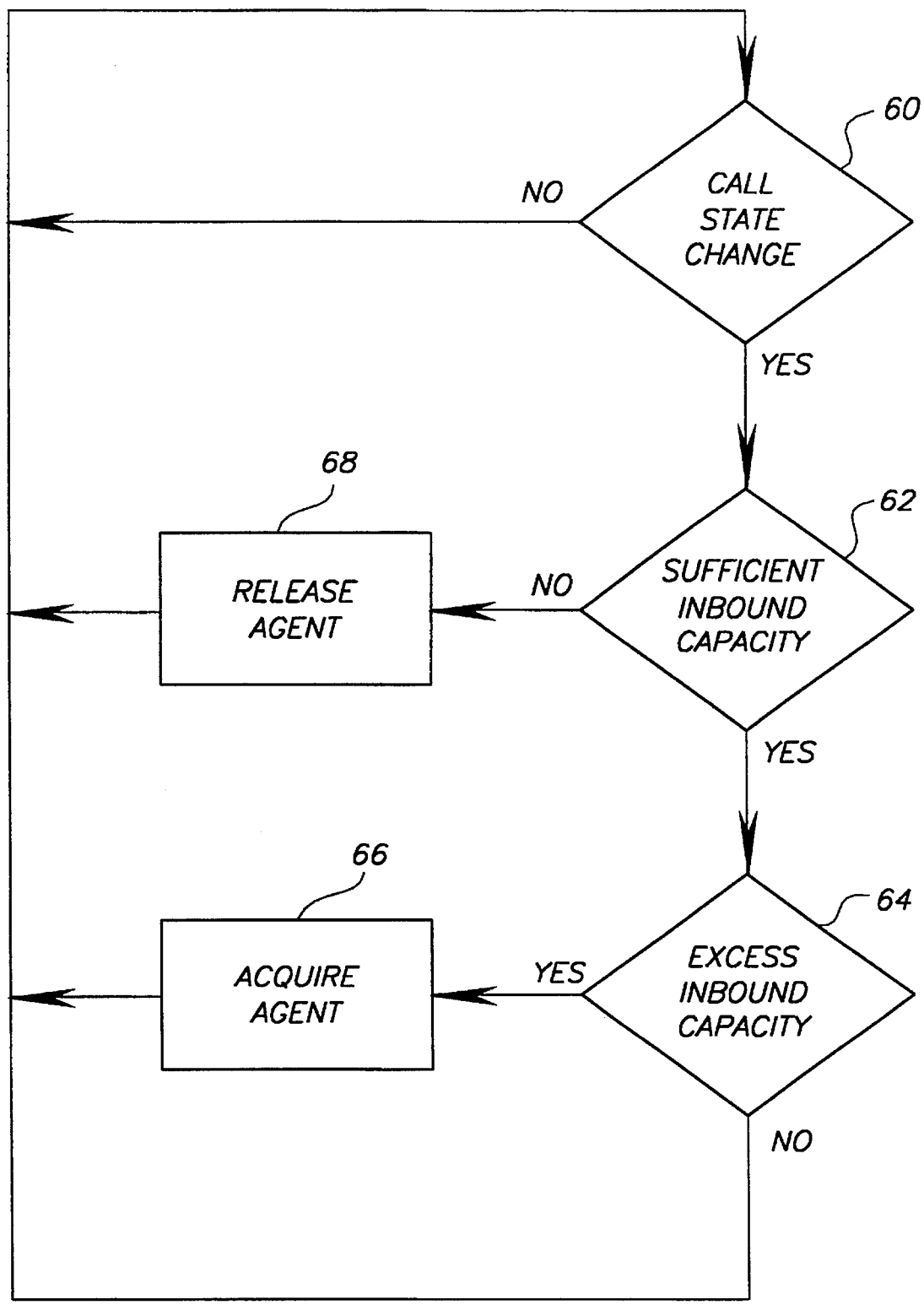
FIG. 3 is a flow chart illustrating the acquisition and release of agents using the present invention.

The analyzer 42 executes the algorithm shown in FIG. 3. In decision block 60, the analyzer determines whether any call has changed states. The change in state includes events such as call abandonment, the connection of a waiting call to an available agent, or the termination of a call following servicing by an agent. If there has been no change in the call state, the result of decision block 60 is "NO" and the program loops until there is a change in call state. If there is a change in call state, the result of decision block 60 is "YES" and decision block 62 checks to determine whether there is a sufficient agent capacity to service the inbound call volume. If there is sufficient agent capacity, the result of decision block 62 is "YES". The analyzer 42 then checks in decision block 64 to determine whether there is excess agent capacity servicing inbound calls. The criteria used to determine whether there is sufficient or excess agent capacity are discussed below. If there is not excess agent capacity servicing inbound calls, the result of decision block 64 is "NO" and the program loops back to decision block 60. If the system determines that there is excess agent capacity servicing inbound calls, the result of decision block 64 is "YES" and the system 10 acquires a blend agent in block 66. The acquired agent is transferred from servicing inbound calls to servicing outbound calls. Following the acquisition of a blend agent, control of the program is returned to decision block 60.

If there is not sufficient agent capacity servicing inbound calls, the result of decision block 62 is "NO." In that event, the system 10 releases an acquired agent in block 68. As described above, an acquired agent is released by terminating the communications link on the internal communications trunk line 40 between the outbound dialer 30 and the ACD 18 (see FIG. 2). The released agent is transferred from servicing outbound calls to servicing inbound calls.

As previously stated, the decision whether to acquire an agent or release an agent is made based on the desired level of service quality for a particular call servicing operation and/or the desired agent performance. Many measures of the level of service quality may be used satisfactorily with the present invention. The abandonment rate and the ASA are frequently used. Agent utilization (the amount of time spent on call related work relative to the total time available) is a common performance measure. The measure of the level of service quality, whether it is the ASA, abandonment rate, some additional factor, or a combination of factors, may be referred to as a "response indicator." The system 10 may also be programmed to provide response indicators for different types of call servicing operations. In the previous example, where different directory numbers identify the type of service required by an inbound call, the user may determine that customer service calls require a higher level of service quality than customer billing inquiry calls. Accordingly, the response indicators may be independently adjusted for the customer service calls and for customer billing inquiry calls. If the response indicator for any type of call service is below a predetermined value for that call service and agent utilization is below a predetermined value, an agent may be acquired from that inbound call servicing operation to service outbound calls in a related outbound call servicing operation. Alternatively, the acquired agent may be used to service inbound or outbound calls from an unrelated call servicing operation or to perform some other activity, as will be discussed below. The analyzer 42 determines the response indicator using the compiled statistics.

Figure 4:
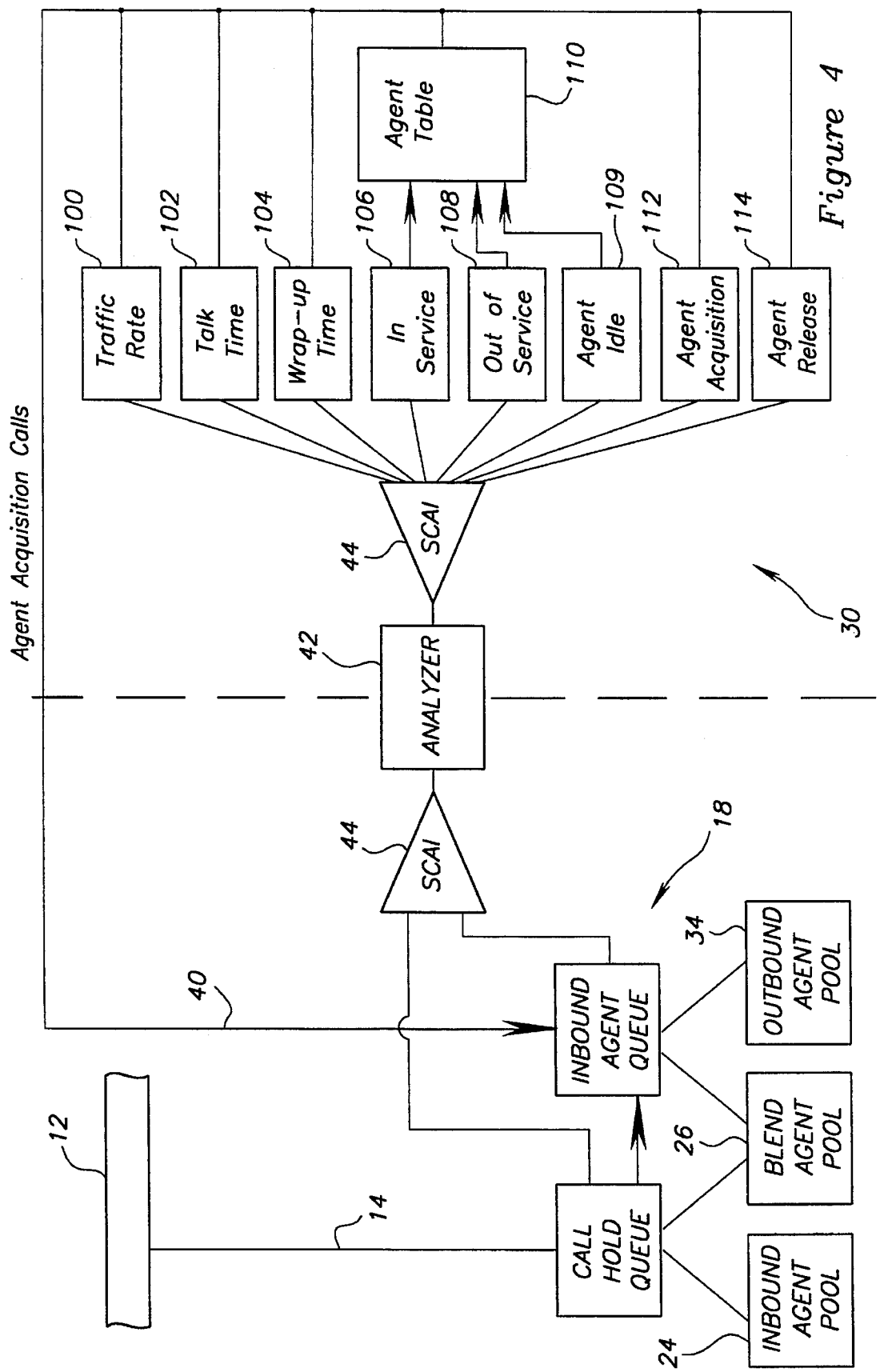
FIG. 4 is a functional block diagram illustrating monitoring of call servicing operations using the present invention.

The analyzer 42, using the SCAI 44 or other monitoring means, may determine a variety of statistics for both inbound and outbound calls as shown in FIG. 4. The analyzer 42 monitors the traffic rate 100, that is, the rate of inbound and outbound calls. The traffic rate is the average arrival rate for inbound calls offered to the system 10. In addition, the analyzer 42 monitors the talk time 102, which is the amount of time that an agent is actually on the communications line servicing a call. Following completion of a call, an agent may be required to perform additional tasks to complete the servicing of the call, sometimes called the wrap-up time 104. Agent wrap-up time is the amount of time an agent spends working on the call, from the end of the agent's talk portion of the call until the agent is ready for another call. This may include completion of information for a customer order, a billing request, arrangements for payment of a bill, or the like. The agent work time is determined as the sum of the agent talk time 102 and the agent wrap-up time 104. The status of all agents in the agent pool is also monitored by the analyzer 42. For example, the analyzer 42 monitors when agents take a break and are unavailable for call servicing. The analyzer monitors the status of in-service agents 106 and out-of-service agents 108 as well as idle agents 109, who are available to service calls, but are not currently servicing a call. This may be done using an agent table 110, which lists the current status of each agent. The analyzer 42 must also keep track of the agents acquired 112 or released 114 by the process described above. It is obvious to those of ordinary skill in the art that other statistics may be used to monitor the status of agents and the performance of agents. The statistics relating to inbound calls may be used to estimate the number of agents required to service incoming calls while maintaining the measure of the level of service quality at a predetermined value.

These statistics may be directly derived from the ACD 18 or may be computed indirectly depending on the type of ACD 18 coupled to the system 10. An ACD 18 typically provides some status messages to the analyzer 42. The normal status messages include connect and disconnect messages indicating when a particular agent has been connected to an inbound telephone call and when the inbound call has terminated. Other statistics must be derived, inferred or imputed from the typical ACD 18 status messages. For example, if a particular agent is coupled to an inbound call, the analyzer 42 receives a status message from the ACD 18. When the inbound call is terminated, the analyzer 42 is informed of the termination by a status message from the ACD 18. The average agent wrap-up time or other statistic based on wrap-up time can be updated directly if the next call given to the agent by the ACD was previously queued. If the next call was queued it means that all agents were busy servicing calls and there was no opportunity for idle time by this agent between calls. Thus, the wrap-up time is the measured wrap-up time whenever possible. If the next call given the agent was not previously queued then there is a high probability that this agent was not busy and that there was some idle time between the end of the agent wrap-up time 104 for the previous call and the connection of this next call. In this case the agent wrap-up time 104 is estimated or imputed to be some fraction (always less than one) of the average wrap-up time. Estimating the contribution to the average as a fraction less than one tends to increase the probability that an agent will be acquired for outbound calling. In the long run this will tend to lower the number of available agents servicing inbound calls and will eventually force calls to be queued, resulting in more accurate estimates of agent wrap-up time. Thus, as long as the fractional estimate of the average wrap-up time is less than one, the system will be forced to an equilibrium state where the correct wrap-up time statistic is available. If a particular agent is not coupled to another inbound telephone call for a period of time exceeding the average wrap-up time as calculated by the analyzer 42, the analyzer may infer that the agent status has changed from wrap-up to idle. The analyzer 42 may alter the agent table 110 accordingly. The number of agents in service is the number of agents who are truly working on calls or idle and waiting for a call. This may differ from the number logged on. The number of agents available may be determined from call connect events. When the ACD connects a call to a particular agent that agent is marked as being in service. When an agent stays in the work state (either talk or wrap-up) for an inordinate amount of time the agent is marked as not being in service. The definition of "inordinate" is system dependent, but is related to the average work time. Since the ACD normally assigns calls to available agents on a rotating basis ("first available" or "most idle") the available agents will quickly be detected because they are the ones to whom calls will be connected. As in the case of estimating agent wrap-up time, the estimate that an agent is available tends to increase the probability that an agent will be acquired for outbound calling. In the long run this will tend to lower the number of available agents servicing inbound calls and will eventually force calls to be queued, resulting in a more accurate estimate of agent available agents as well as of agent wrap-up time. Thus the system will be forced to an equilibrium state where the correct statistics are available. Thus, the analyzer 42 can indirectly compute statistics from the limited status messages provided by the ACD 18.

Other types of ACDs 18 provide additional status messages that allow direct determination of the statistics. For example, ACDs such as the AT&T model 5ESS provide status messages to indicate agent log-in and log-out, so that the analyzer 42 knows if the agent is in-service 106 or out-of-service 108. This allows the system 10 to directly determine the number of agents currently working on the system 10 in both inbound call servicing or outbound call servicing. Similarly, the model 5ESS provides a status message when an agent has completed the after call servicing and is available to service additional inbound calls. This status message allows the direct computation of agent wrap-up time 104. The system 10 is designed to operate effectively with ACDs providing more complete status messages or those ACDs which provide only limited status messages.

These statistics may be compiled to predict the inbound call volume. The analyzer 42 may use the compiled statistics to determine the number of agents required to service inbound calls so that the response time is below the predetermined value and/or the performance is above the predetermined value. The analyzer 42 will release any acquired agents in anticipation of an increase of inbound call volume as predicted by the compiled statistics. Similarly, the analyzer may acquire agents for outbound call servicing if the compiled statistics predict that the inbound call volume is decreasing.

Prior art systems use a historical call profile to manually schedule staffing requirements. Prior art systems do not use blend agents to meet the demands of peak inbound call volume. In contrast, the present invention compiles call statistics to dynamically predict peak inbound call volumes. Blend agents are used to meet the demands of peak inbound call volume, thus simplifying the agent scheduling procedure. Furthermore, the inventive system 10 acquires and releases agents in a unique manner using compiled call statistics to predict agent staffing requirements.

The present invention is designed to simultaneously optimize the level of service quality and agent utilization. The various measures of service quality are discussed above. The agent utilization, which may also be called agent productivity, can also be measured by the analyzer 42. For purposes of the present invention, agent productivity may be defined as the ratio of inbound call traffic rate to the product of inbound call service rate and the number of agents available for servicing inbound call traffic when the ratio is less than one. If the ratio is greater than one, the agent productivity is one, which indicates that the agent is always busy servicing inbound calls. The inbound call service rate is defined as the reciprocal of the amount of time required to service inbound calls, including talk time 102 and wrap-up time 104. The number of agents available for servicing inbound calls includes both agents who are currently busy servicing an inbound call and agents who are currently idle but are available to service an inbound call. The ratio gives an estimate of the percentage of agent capacity over a period of time. For example, a ratio of one indicates that the capacity to service calls exactly matches the demand for service. A ratio of 0.5 indicates that the demand for call servicing is one half the capacity for servicing the demand (i.e., the agents are busy one half of the time).

As described above, some call servicing operations assign different measures of the level of service quality to different aspects of the call servicing operation. Similarly, different aspects of the call servicing operations may desire different levels of agent productivity. If agents are operating at 100% efficiency, there may be job dissatisfaction and a high turnover rate. On the other hand, low productivity is not cost effective, and may lead to job boredom. Therefore, the present invention allows call servicing operations to select the level of agent productivity best suited for their needs. Furthermore, the present invention allows a call servicing operation to independently select a predetermined level 6f productivity and measure of the level of service quality. The system 10 strives to simultaneously optimize both of these criteria. For example, a particular call servicing operation may determine that 90% agent productivity allows the agents to have some idle time between servicing inbound calls, while at the same time preventing job boredom. The call servicing operation may also determine that a high level of service quality must be maintained because of the nature of the inbound calls. For example, inbound calls must be coupled to an agent in less than 20 seconds because the call servicing operation is a customer ordering operation. The system 10 acquires agents for outbound call servicing if the measured agent productivity is less than 90%, and all inbound calls are being serviced in less than 20 seconds. Agent acquisition may be controlled by either agent productivity, the measured level of service quality, or both. The system 10 releases agents if the inbound calls are not being serviced in less than 20 seconds. Alternatively, the system 10 may release agents if the productivity of the remaining inbound agents exceeds the 90% goal.

The system 10 may also be designed to allow temporary changes in agent productivity above the predetermined goal. For example, a transient increase in incoming call rate may cause the agent productivity to be 100%, but only for a short period of time. The system 10 may be designed to allow such short fluctuations for a predetermined period of time. Note that if the agent productivity is 100%, the measure of the level of service quality may also be affected. For example, if the agents servicing inbound calls are busy 100% of the time, some inbound calls may be waiting for more than 20 seconds. In that case, the system 10 may release an acquired agent in order to meet the predetermined goal for the measure of service quality. Thus, the system 10 may be used to optimize both agent productivity and service quality, or may optimize one criterion at the expense of the other.

Figure 5A:
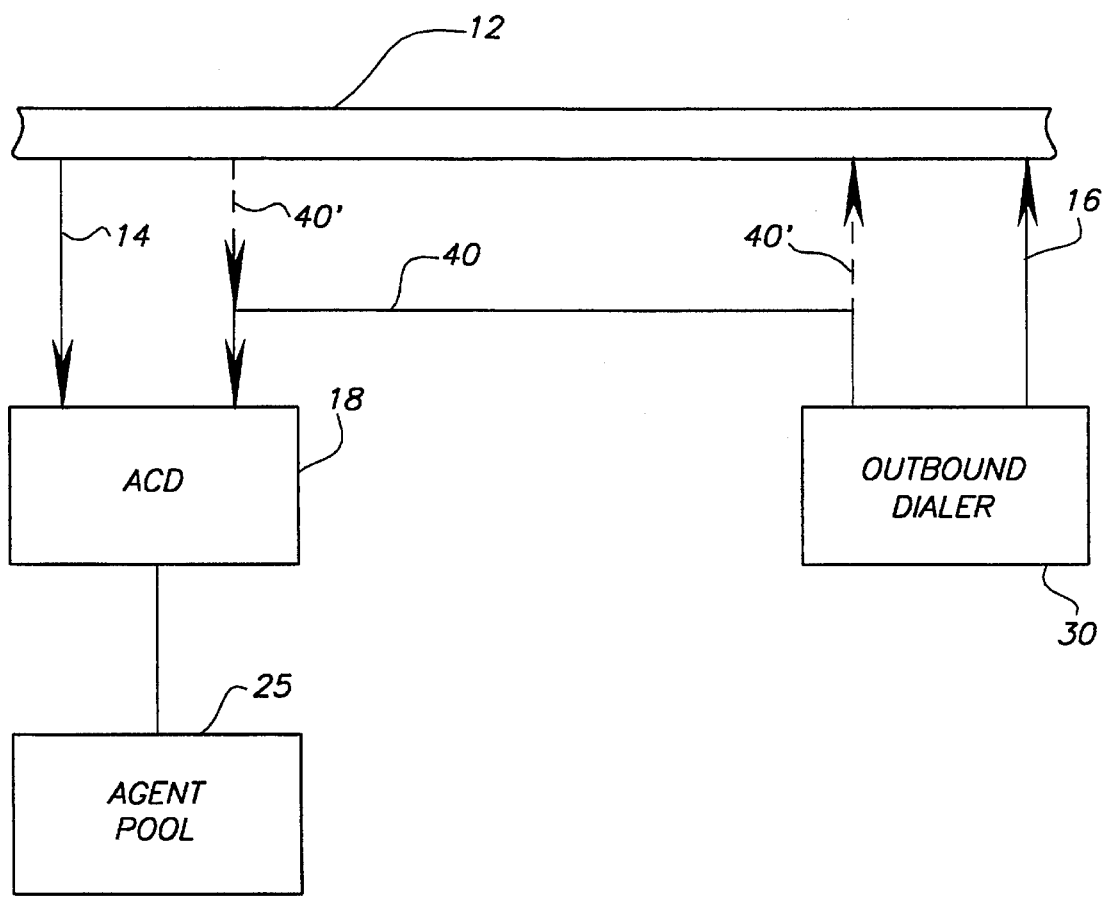
FIGS. 5A and 5B are functional block diagrams illustrating alternative embodiments of the present invention.
Figure 5B:
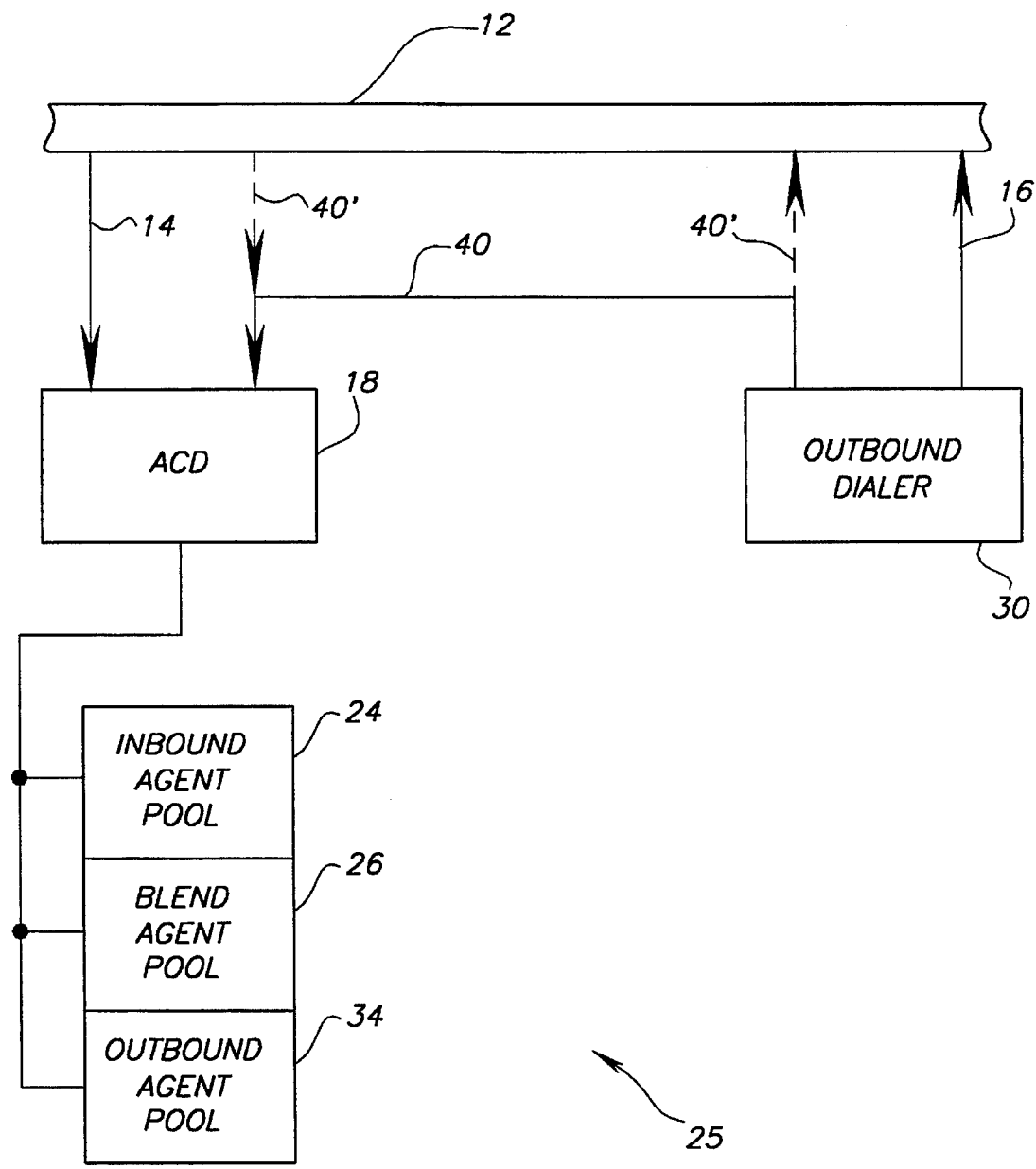

The present invention may be used with automatic call distributors manufactured by a variety of companies. The ACD 18 is programmed to select from the agent pool an agent who has been defined as being from the agent pool appropriate for servicing the application defined by the directory number. A variety of agent pool configurations may be used satisfactorily with the inventive system 10. For example, the inbound agent pool 24 and the blend agent pool 26 may initially be placed in separate agent pools and coupled to the ACD 18 with the outbound agent pool 34 coupled directly to the outbound dialer 30 as illustrated in FIG. 2. However, all agents may initially be placed in a single agent pool 25 coupled to the ACD 18, as shown in FIG. 5A. The agent pool 25 may be broken down into separate agent pools 24, 26, and 34 as shown in FIG. 5B. Agents may be acquired to service outbound telephone calls by placing internal agent acquisition calls as previously described. Alternatively, all agents could initially be placed in a single agent pool or multiple agent pools coupled directly to the outbound dialer 30, and released in the manner described above to service inbound telephone calls. As previously noted, the internal communications trunk line 40' may be part of the telephone exchange 12 or may be separate internal communications trunk lines 40 physically coupling the ACD 18 to the outbound dialer 30.

Figure 6A:
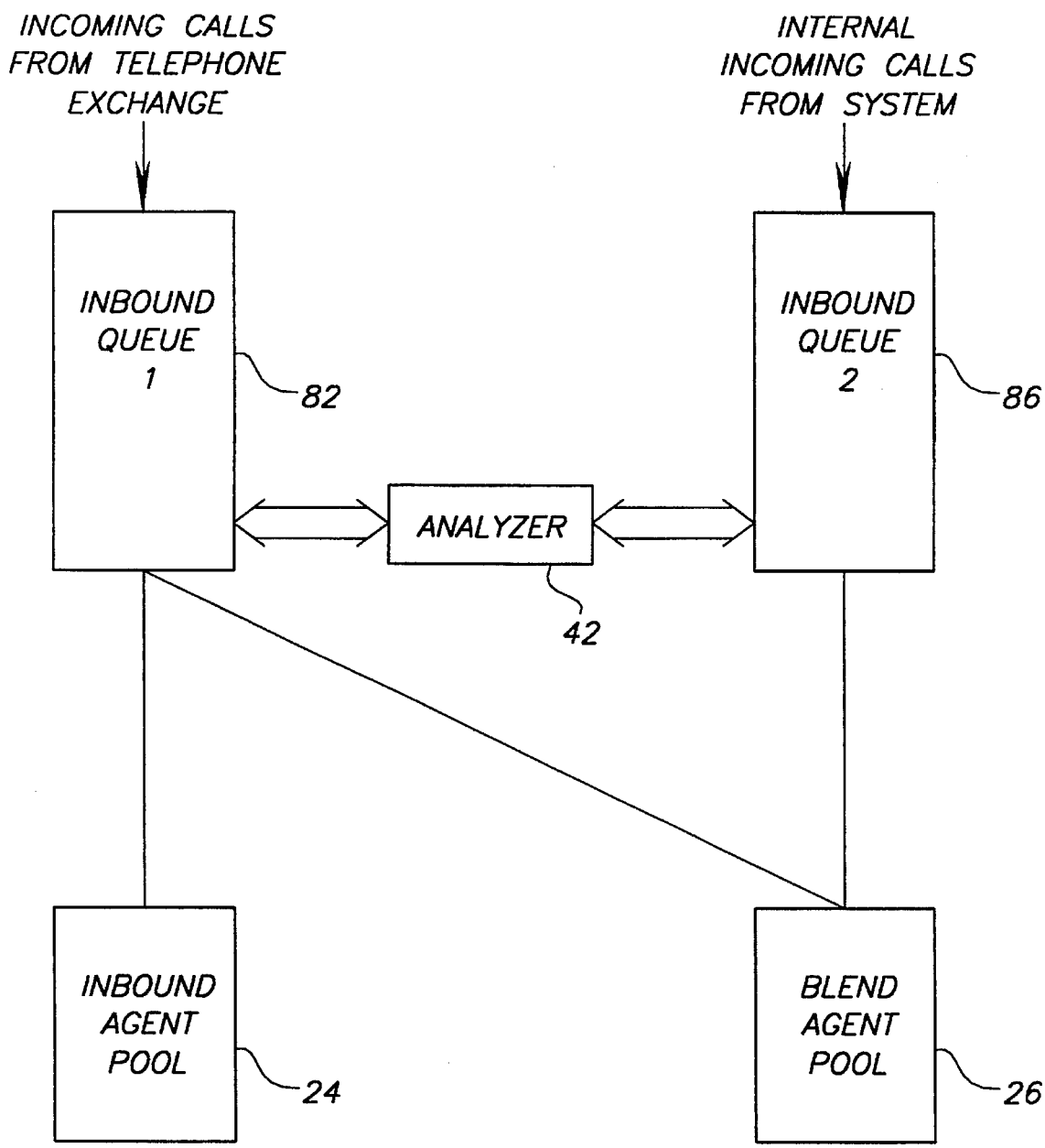
FIG. 6A illustrates an agent acquisition procedure used with the present invention when using a typical ACD.

The different agent pool configurations correspond to different internal configurations of the ACD 18. As an example of the use of agent pools, consider the illustration of FIG. 6A, in which the ACD 18 contains two inbound queues, number one queue 82 and number two queue 86, which hold incoming calls received by the ACD. In this internal ACD configuration, the agents in the inbound agent pool 24 are assigned to number one queue 82 and are designated as inbound-only agents. Inbound-only agents are never acquired for outbound call servicing. The number two queue 86 is used by the present invention to acquire blend agents from a blend agent pool 26. The ACD 18 will receive inbound calls from the telephone exchange 12 and direct them to the inbound-only agents in the inbound agent pool 26 before directing any inbound calls to blend agents in the blend agent pool 26. The ACD 18 will direct calls to blend agents only during periods of peak inbound call volume if all of the inbound-only agents in the inbound agent pool 24 are occupied.

During non-peak periods, the inbound call volume is low enough that blend agents from the blend agent pool 26 are not required for inbound call servicing. The blend agent may be acquired from the blend agent pool 26 by having the system 10 place an internal telephone call through the number two queue 86 to acquire one or more of the blend agents. Note that the ACD 18 will never direct a call through the number two queue 86 to an inbound-only agent in the inbound agent pool 24. Thus, the inbound calls from the telephone exchange 12 are directed first to the inbound-only agents in the inbound agent pool 24, with the peak inbound call volume these inbound-only agents cannot handle being directed to the blend agents in the blend agent pool 26. When the inbound call volume from the telephone exchange is low, the calls in number one queue 82 are directed only to the inbound-only agents in the inbound agent pool 24. This allows blend agents in the blend agent pool 26 to be acquired by the system 10 for outbound call servicing. The blend agents are acquired by placing a call to the number two queue 86, which the ACD 18 directs only to the blend agents in the blend agent pool 26.

Figure 6B:
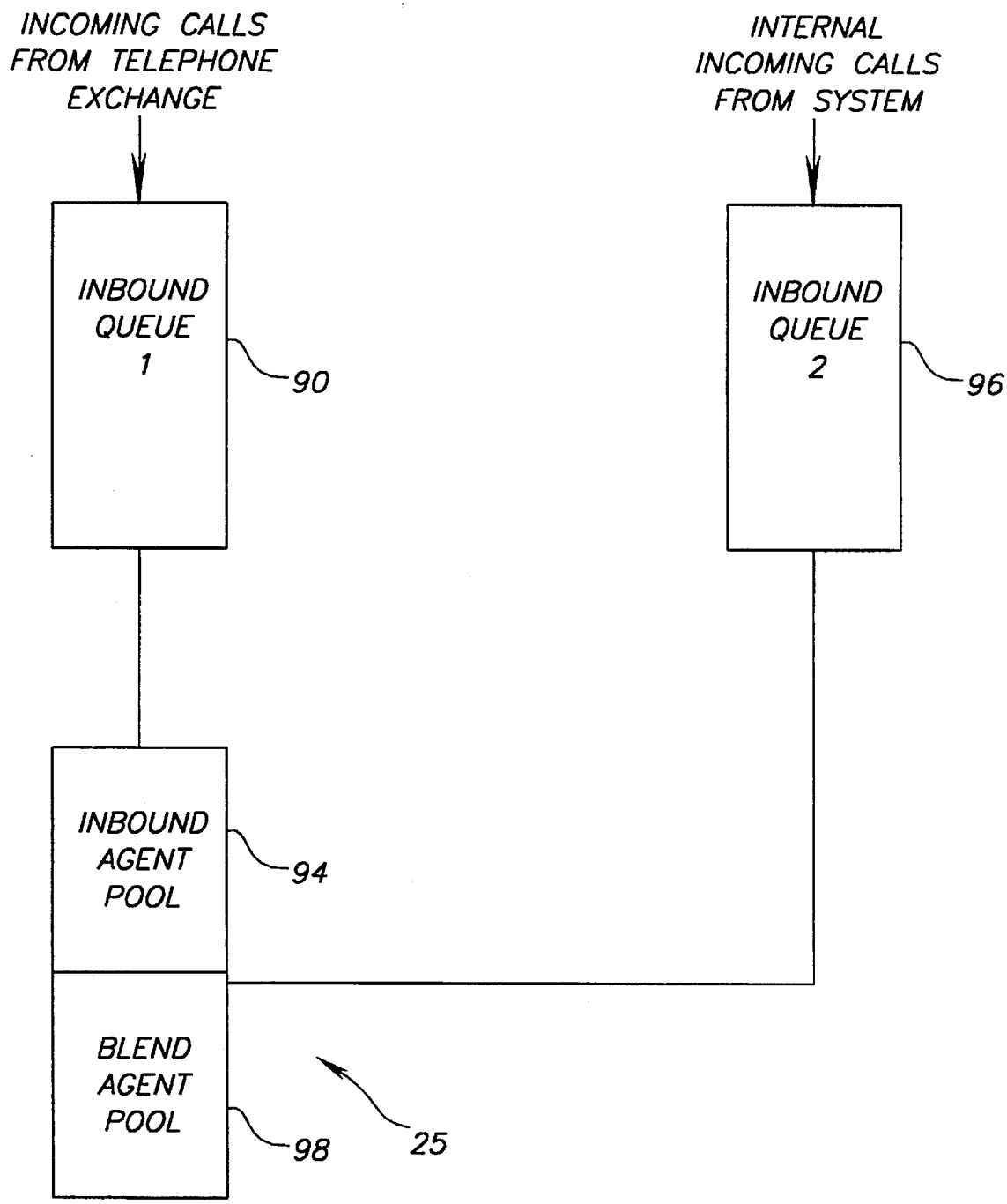
FIG. 6B illustrates an agent acquisition procedure used with the present invention when using another type of ACD.

In a different internal ACD configuration, shown in FIG. 6B, there are two inbound queues, number one queue 90 and number two queue 96, which operate in the manner described above for inbound number one and two queues 82 and 86. However, the ACD 18 uses a single agent pool 25 in which agents are designated as inbound-only agents 94 or blend agents 98. As with the previous ACD configuration, the ACD 18 will initially direct inbound calls only to the agents designated as inbound-only agents 94 in the agent pool 25. Only during periods of peak inbound call volume, when all inbound-only agents 94 are busy, will the ACD 18 direct some of the peak inbound call volume to agents designated as blend agents 98. In the non-peak periods, the system 10 will place agent acquisition calls through the ACD 18 to inbound number two queue 96. These calls are directed only to the blend agents 98 in the agent pool 25.

The present invention may operate satisfactorily with a number of agent access modes available in a typical ACD. A common mode is the first in first out mode in which calls in an inbound queue are processed in the order in which they are received. Thus, the call that is waiting the longest will be the first call serviced. The ACD 18 may be programmed for a priority mode in which a special customer, for example, will receive priority service by calling a special number. These priority calls are processed ahead of other calls that may be waiting in the inbound queue. Other modes, well known to those in the art, are also available.

As discussed above, there are many possible alternative embodiments of the inventive system 10 for use with a variety of internal configurations of the ACD 18. In the example illustrated in FIG. 5A, a single agent pool 25 is coupled to the ACD 18. In this manner, all agents in the agent pool 25 may be designated as blend agents. Alternatively, a minimum number of agents may be designated to service outbound calls only or a minimum number of agents designated to service inbound calls only, or both. Blend agents may be acquired to service outbound calls in the manner previously described. Agents who are designated as inbound agents only, or blend agents who are currently servicing inbound calls, are coupled to the dedicated inbound communication lines 14 through the ACD 18, as previously described.

Agents who are designated to service outbound calls only, or acquired blend agents, are coupled to the dedicated outbound communication lines 16 through the ACD 18 and the outbound dialer 30, as previously described. The process of acquiring a blend agent and releasing an acquired agent occurs in the same inventive method previously described.

Some call servicing operations have additional needs beyond inbound and outbound call servicing. For example, a typical call servicing operation may have need of word processing services. Other call servicing operations may have a small outbound call mission, or no outbound call mission at all. The principles of the present invention may be applied to call servicing operations in which acquired agents perform alternative services besides outbound call servicing. These alternative services may include word processing, filing, or other clerical or managerial duties, or the like. The agents are acquired and released in the manner described above.

In some call servicing operations, the agent pools may be assigned to different call operations. For example, a first pool of agents may be assigned to a first client and will service the first client's inbound and outbound calls in the manner described above. The agents assigned to the first client may be in separate agent pools 24, 26, and 34 as shown in FIG. 2, or may be in a single agent pool 25, as shown in FIG. 5A. The agents servicing the first client may be acquired or released, as described above, as inbound call volume to the first client fluctuates. A second group of agents may be assigned to a second client to service the second client's inbound and outbound calls. Similarly, the agents assigned to the second client may be in separate agent pools 24, 26, and 34 as shown in FIG. 2, or may be in a single agent pool 25, as shown in FIG. 5A. It should be noted that the agent pool or pools for client number one are not the same as the agent pool or pools for client number two. The principles of the present invention may be independently applied to the different call operations. Furthermore, the present invention allows agents assigned to one client to be acquired by another client if the analyzer 42 determines that the acquisition will not cause the response indicator to exceed the predetermined period of time for the call operation from which the agent will be acquired. Because the analyzer 42 determines the status of all agents, the quality level of service for all inbound and outbound call operations may be maintained.

Some prior art call servicing systems have a large pool of agents which may be designated as inbound agents, outbound agents, or both. However, these prior art systems do not use a fixed number of inbound communication lines and outbound communication lines. As the inbound call volume increases, the prior art systems switch trunk lines from outbound communication lines to inbound communication lines. It should be noted that this prior art system does not switch agents. Agents using the prior art system are assigned to a single pool and perform both inbound and outbound call servicing.

A drawback of the prior art system is that peak inbound call volume may cause all available agents to service inbound calls which allows the outbound call rate to drop to zero even though there may be a number of outbound communication lines available. If the prior art system switches too many outbound communication lines to inbound communication lines, there may be an insufficient number of outbound communication lines. This may effectively reduce the outbound calling rate even if there is sufficient agent capacity to maintain an outbound call servicing operation.

Another drawback to the prior art approach of switching trunk lines between being inbound communication lines and being outbound communication lines is the occurrence of glare. Glare is a term of art used to describe a condition in which a communication line is seized by an outbound dialer to make an outbound telephone call at the same moment that the communication line receives an inbound telephone call. The result is that the inbound caller experiences a loud unpleasant noise due to the competition for the same line between the inbound and outbound telephone calls.

In contrast, the system 10 of the present invention uses a set number of dedicated inbound communication lines 14 and dedicated outbound communication lines 16 and does not switch communication lines from inbound call servicing to outbound call servicing during the performance of a calling mission. It is possible that changes in a customer's call service operations may require a change in the number of dedicated inbound communication lines 14 and dedicated outbound communication lines 16. The inventive system 10 allows such a reconfiguration, but does not switch communication lines during the call servicing operation. In this manner, glare is eliminated since there will never be competition for the same communication line between inbound and outbound call servicing. Instead of switching trunk lines to accommodate fluctuations in inbound call volume, the system 10 of the present invention switches the agents between inbound and outbound call servicing. The system 10 allows the user to specify a minimum number of agents for the outbound agent pool 34. In this manner, it is possible to maintain a minimum rate of outbound telephone calls, despite an increase in inbound call volume.

Those skilled in the art will appreciate that the novel approach to call servicing taken by the present invention provides for maximum utilization of agents, for both inbound and outbound call servicing. The acquisition of blend agents through the ACD 18 allows the analyzer 42 to monitor agent status and maintain minimum quality standards for both inbound and outbound call servicing. The use of dedicated inbound communication lines 14 and dedicated outbound communication lines 16 avoids the problem of glare and assures that outbound call servicing always has communication lines available for use.

It should be noted that some examples presented herein depict a single agent pool coupled to the ACD 18. The agents are transferred to outbound call servicing through the ACD 18, as described above. It is clear that the same inventive approach may be used to transfer agents from a pool of agents coupled to the outbound dialer 30 instead of the ACD 18. The agents are transferred to inbound call servicing through the outbound dialer 30 and the ACD 18.

It is to be understood that even though various embodiments and advantages of the present invention have been set forth in the foregoing description, the above disclosure is illustrative only, and changes may be made in detail, yet remain within the broad principles of the present invention. Therefore, the present invention is to be limited only by the appended claims.

We claim:

1. A system for simultaneously maximizing productivity and call servicing quality by sharing pools of agents handling inbound and outbound telephone calls on a telephone exchange, each agent having a communication device, the system comprising:
- a plurality of trunk lines coupled to the telephone exchange and designated as dedicated inbound communication lines solely to receive inbound telephone calls;
- a plurality of trunk lines coupled to the telephone exchange and designated as dedicated outbound communication lines solely to place outbound telephone calls;
- a stand-alone automatic call distributor coupled to said dedicated inbound communication lines to receive inbound telephone calls from the telephone exchange and couple the inbound telephone calls to the communication devices of the agent pool containing a plurality of inbound agents and containing at least one blend agent, said blend agent being designated to service both inbound and outbound telephone calls as needed;
- a stand-alone outbound dialer coupled to said dedicated outbound communication lines to automatically place outbound telephone calls for a plurality of agents in the agent pool designated as outbound agents and for said blend agent when servicing outbound telephone calls;
- an analyzer to analyze inbound telephone calls, to determine a response indicator indicative of a level of service quality, and to determine agent productivity;
- acquisition means for acquiring control of the communication device of said blend agent to service an outbound telephone call if said response indicator indicates that said level of service quality exceeds a predetermined service quality goal and said productivity is less than a predetermined productivity goal, said acquisition means using said outbound dialer to place an acquisition telephone call through said automatic call distributor to acquire control of the communication device of said blend agent to couple the communication device of said acquired blend agent to one of said dedicated outbound communication lines via said automatic call distributor and said outbound dialer to service said outbound telephone call; and
- releasing means for releasing control of the communication device of said acquired blend agent if said response indicator indicates that said level of service quality is less than said predetermined service quality goal, said releasing means terminating said acquisition telephone call, whereby the communication device of said acquired blend agent is selectively acquired for and released from outbound telephone call servicing by establishing and terminating said acquisition telephone call using said outbound dialer and said automatic call distributor.

2. The system of claim 1 wherein said analyzer compiles a set of statistics relating to the inbound telephone calls and uses said compiled statistics to measure said level of service quality.

3. The system of claim 2 wherein said compiled statistics includes the rate of incoming calls, the duration of incoming calls, the number of said inbound agents available to service inbound telephone calls, current status of said inbound agents, and the time required by said inbound agents to process data after termination of inbound calls.

4. The system of claim 2 wherein said analyzer uses said compiled statistics to estimate the number of said inbound agents required to service inbound telephone calls and achieve said predetermined service quality goal.

5. The system of claim 1 wherein said outbound dialer is a predictive outbound dialer, said outbound dialer automatically changing the rate of outbound telephone calls as the communication device of said acquired blend agent is acquired or released.

6. The system of claim 1 wherein said automatic call distributor initially couples inbound telephone calls to the communication devices of said plurality of inbound agents until all of said plurality of inbound agents are servicing inbound telephone calls before coupling any inbound telephone calls to the communication device of said blend agent.

7. The system of claim 1, further including a switch to computer interface coupled to said automatic call distributor to monitor the status of said dedicated inbound communication lines, the status of said dedicated outbound communication lines, and the status of said inbound agents, said blend agent and said outbound agents.

8. A method of simultaneously maximizing productivity and call servicing quality by sharing a pool of agents using a stand-alone automatic call distributor with a stand-alone outbound dialer, the automatic call distributor and the outbound dialer both being coupled to a telephone exchange, each agent having a communication device, the method comprising the steps of:
- (a) creating a pool of inbound agents having their communication devices coupled to a plurality of trunk lines coupled to the telephone exchange and designated as dedicated inbound communication lines solely to receive inbound telephone calls, a pool of outbound agents having their communication devices coupled to a plurality of trunk lines coupled to the telephone exchange and designated as dedicated outbound communication lines solely to place outbound telephone calls, and a pool of blend agents designated as either inbound or outbound agents, the communication devices of said blend agents alternatively coupled to either said dedicated inbound communication lines or said dedicated outbound communication lines to selectively service either inbound or outbound telephone calls;
- (b) determining a level of productivity for said inbound agents, said outbound agents, and said blend agents;
- (c) determining a response indicator indicative of a level of service quality;
- (d) placing an acquisition telephone call to the communication device of one of said blend agents who is currently servicing inbound telephone calls using the outbound dialer if said productivity is less than a predetermined productivity goal and said response indicator indicates that said level of service quality exceeds a predetermined service quality goal; and
- (e) upon connection of said acquisition telephone call to the communication device of said one blend agent, acquiring control of the communication device of said one blend agent by coupling the communication device of said one blend agent to one of said dedicated outbound communication lines via the outbound dialer and the automatic call distributor to service said outbound telephone calls.

9. The method of claim 8, further including the step of compiling a set of statistics related to said inbound telephone calls, said statistics being used to measure said level of productivity and to determine said response indicator.

10. The method of claim 9 wherein said compiled statistics include the rate of incoming calls, the duration of incoming calls, the number of said inbound agents available to service inbound telephone calls, current status of said inbound agents, and the time required by said inbound agents to process data after termination of inbound calls.

11. The method of claim 9, further including the step of using said compiled statistics to estimate the number of said inbound agents required to service inbound telephone calls and achieve said predetermined service quality goal.

12. The method of claim 8, further including the step of:
(f) releasing control of the communication device of said one blend agent by terminating said acquisition telephone call if said response indicator indicates that said level of service quality is less than said predetermined service quality goal, said one blend agent returning to servicing inbound telephone calls, whereby control of the communication device of said one blend agent is selectively acquired for and released from outbound telephone call servicing by establishing and terminating an acquisition telephone call using the outbound dialer and the automatic call distributor.

13. The method of claim 8, further including the step of directing inbound telephone calls to the communication devices of said pool of inbound agents until each of the agents in said pool of inbound agents is servicing inbound telephone calls, and then directing additional inbound telephone calls to the communication devices of said pool of blend agents.

14. The method of claim 8 wherein the outbound dialer is a predictive dialer, the method further including the step of changing the rate of outbound telephone calls as control of the communication device of said one blend agent is acquired and released.

15. A system for dynamically sharing pools of agents handling inbound and outbound telephone calls on a telephone exchange, each agent having a communication device, the system comprising:

a plurality of trunk lines coupled to the telephone exchange and designated as inbound communication lines to receive inbound telephone calls;

a plurality of trunk lines coupled to the telephone exchange and designated as outbound communication lines to place outbound telephone calls;

a stand-alone automatic call distributor coupled to said inbound communication lines to receive inbound telephone calls from the telephone exchange and couple the inbound telephone calls to the communication devices of the agent pool containing a plurality of inbound agents and containing at least one blend agent, said blend agent being designated to service both inbound and outbound telephone calls as needed;

a stand-alone outbound dialer coupled to said outbound communication lines to automatically place outbound telephone calls for a plurality of agents in the agent pool designated as outbound agents and for said blend agent when servicing outbound telephone calls;

an analyzer to analyze inbound telephone calls, to determine a response indicator indicative of a level of service quality;

acquisition means for acquiring control of the communication device of said blend agent to service an outbound telephone call if said response indicator indicates that said level of service quality exceeds a predetermined service quality goal, said acquisition means using said outbound dialer to place an acquisition telephone call through said automatic call distributor to acquire control of the communication device of said blend agent to couple the communication device of said acquired blend agent to one of said dedicated outbound communication lines via said automatic call distributor and said outbound dialer to service said outbound telephone call; and releasing means for releasing control of the communication device of said acquired blend agent if said response indicator indicates that said level of service quality is less than said predetermined service quality goal, said releasing means terminating said acquisition telephone call, whereby the communication device of said acquired blend agent is selectively acquired for and released from outbound telephone call servicing by establishing and terminating said acquisition telephone call using said outbound dialer and said automatic call distributor.

16. A method for dynamically sharing pools of agents using a stand-alone automatic call distributor with a stand-alone outbound dialer, the automatic call distributor and the outbound dialer both being coupled to a telephone exchange, each agent having a communication device, the method comprising the steps of:

creating a pool of inbound agents having their communication devices coupled to a plurality of trunk lines coupled to the telephone exchange and designated as inbound communication lines to receive inbound telephone calls, a pool of outbound agents having their communication devices coupled to a plurality of trunk lines coupled to the telephone exchange and designated as outbound communication lines to place outbound telephone calls, and a pool of blend agents designated as either inbound or outbound agents, the communication devices of said blend agents alternatively coupled to either said inbound communication lines or said outbound communication lines to selectively service either inbound or outbound telephone calls;

determining a response indicator indicative of a level of service quality;

placing an acquisition telephone call to the communication device of one of said blend agents who is currently servicing inbound telephone calls using the outbound dialer if said response indicator indicates that said level of service quality exceeds a predetermined service quality goal; and upon connection of said acquisition telephone call to the communication device of said one blend agent, acquiring control of the communication device of said one blend agent by coupling the communication device of said one blend agent to one of said outbound communication lines via the outbound dialer and the automatic call distributor to service said outbound telephone calls.

17. A system for simultaneously maximizing productivity and call servicing quality by sharing a pool of agents servicing inbound and outbound telephone calls on a telephone exchange, each agent having a communication device, the system comprising:

a plurality of trunk lines coupled to the telephone exchange and designated as inbound communication lines to receive inbound telephone calls;

a plurality of trunk lines coupled to the telephone exchange and designated as outbound communication lines to place outbound telephone calls;

an automatic call distributor coupled to said inbound communication lines to receive inbound telephone calls from the telephone exchange and couple the inbound telephone calls to the communication devices of a plurality of agents in the agent pool designated as inbound agents, including at least one blend agent, said blend agent being designated to service both inbound and outbound telephone calls as needed;

an outbound dialer coupled to said outbound communication lines to automatically place outbound telephone calls for a plurality of agents in the agent pool designated as outbound agents and for said blend agent when servicing outbound telephone calls;

an acquisition trunk line coupled to said automatic call distributor by a trunk distributor connection and coupled to said outbound dialer by a trunk dialer connection;

an analyzer to analyze inbound telephone calls, to determine a response indicator indicative of a level of service quality, and to determine agent productivity;

acquisition means for acquiring control of the communication device of said blend agent to service an outbound telephone call if said response indicator indicates that said level of service quality exceeds a predetermined service quality goal and said productivity is less than a predetermined productivity goal, said acquisition means using said outbound dialer to place an acquisition telephone call through said acquisition trunk line to said automatic call distributor to acquire control of the communication device of said blend agent and to couple the communication device of said acquired blend agent to one of said outbound communication lines via said automatic call distributor and said outbound dialer to service said outbound telephone call; and releasing means for releasing control of the communication device of said acquired blend agent if said response indicator indicates that said level of service quality is less than said predetermined service quality goal, said releasing means terminating said acquisition telephone call.

18. A system for simultaneously maximizing productivity and call servicing quality by sharing a pool of agents servicing inbound and outbound telephone calls on a telephone exchange, each agent having a communication device, the system comprising:

a plurality of trunk lines coupled to the telephone exchange and designated as inbound communication lines to receive inbound telephone calls;

a plurality of trunk lines coupled to the telephone exchange and designated as outbound communication lines to place outbound telephone calls;

an automatic call distributor coupled to the telephone exchange by said inbound communication lines to receive inbound telephone calls from the telephone exchange and couple the inbound telephone calls to the communication devices of a plurality of agents in the agent pool designated as inbound agents, including at least one blend agent, said blend agent being designated to service both inbound and outbound telephone calls as needed;

an outbound dialer coupled to the telephone exchange by said outbound communication lines to automatically place outbound telephone calls for a plurality of agents in the agent pool designated as outbound agents and for said blend agent when servicing outbound telephone calls;

an analyzer to analyze inbound telephone calls, to determine a response indicator indicative of a level of service quality, and to determine agent productivity;

acquisition means for acquiring control of the communication device of said blend agent to service an outbound telephone call if said response indicator indicates that said level of service quality exceeds a predetermined service quality goal and said productivity is less than a predetermined productivity goal, said acquisition means using said outbound dialer to place an acquisition telephone call on the telephone exchange to said automatic call distributor to acquire control of the communication device of said blend agent and to couple the communication device of said acquired blend agent to one of said outbound communication lines via said automatic call distributor and said outbound dialer to service said outbound telephone call; and releasing means for releasing control of the communication device of said acquired blend agent if said response indicator indicates that said level of service quality is less than said predetermined service quality goal, said releasing means terminating said acquisition telephone call.

19. A system for dynamically sharing a pool of agents servicing inbound and outbound telephone calls on a telephone exchange, each agent having a communication device, the system comprising:

a plurality of trunk lines coupled to the telephone exchange and designated as inbound communication lines to receive inbound telephone calls;

a plurality of trunk lines coupled to the telephone exchange and designated as outbound communication lines to place outbound telephone calls;

an automatic call distributor coupled to said inbound communication lines to receive inbound telephone calls from the telephone exchange and couple the inbound telephone calls to the communication devices of a plurality of agents in the agent pool designated as inbound agents, including at least one blend agent, said blend agent being designated to service both inbound and outbound telephone calls as needed;

an outbound dialer coupled to said outbound communication lines to automatically place outbound telephone calls for a plurality of agents in the agent pool designated as outbound agents and for said blend agent when servicing outbound telephone calls;

an acquisition trunk line coupled to said automatic call distributor by a trunk distributor connection and coupled to said outbound dialer by a trunk dialer connection;

an analyzer to analyze inbound telephone calls, to determine a response indicator indicative of a level of service quality;

acquisition means for acquiring control of the communication device of said blend agent to service an outbound telephone call if said response indicator indicates that said level of service quality exceeds a predetermined service quality goal, said acquisition means using said outbound dialer to place an acquisition telephone call on said acquisition trunk line to said automatic call distributor to acquire control of the communication device of said blend agent to couple the communication device of said acquired blend agent to one of said outbound communication lines via said automatic call distributor and said outbound dialer to service said outbound telephone call;

releasing means for releasing control of the communication device of said acquired blend agent if said response indicator indicates that said level of service quality is less than said predetermined service quality goal, said releasing means terminating said acquisition telephone call.

20. A system for dynamically sharing a pool of agents servicing inbound and outbound telephone calls on a telephone exchange, each agent having a communication device, the system comprising:

a plurality of trunk lines coupled to the telephone exchange and designated as inbound communication lines to receive inbound telephone calls;

a plurality of trunk lines coupled to the telephone exchange and designated as outbound communication lines to place outbound telephone calls;

an automatic call distributor coupled to said inbound communication lines to receive inbound telephone calls from the telephone exchange and couple the inbound telephone calls to the communication devices of a plurality of agents in the agent pool designated as inbound agents, including at least one blend agent, said blend agent being designated to service both inbound and outbound telephone calls as needed;

an outbound dialer coupled to said outbound communication lines to automatically place outbound telephone calls for a plurality of agents in the agent pool designated as outbound agents and for said blend agent when servicing outbound telephone calls;

an analyzer to analyze inbound telephone calls, to determine a response indicator indicative of a level of service quality;

acquisition means for acquiring control of the communication device of said blend agent to service an outbound telephone call if said response indicator indicates that said level of service quality exceeds a predetermined service quality goal, said acquisition means using said outbound dialer to place an acquisition telephone call on the telephone exchange to acquire control of the communication device of said blend agent and to couple the communication device of said acquired blend agent to one of said outbound communication lines via said automatic call distributor, the telephone exchange and said outbound dialer to service said outbound telephone call; and releasing means for releasing control of the communication device of said acquired blend agent if said response indicator indicates that said level of service quality is less than said predetermined service quality goal, said releasing means terminating said acquisition telephone call.

21. A system for dynamically sharing a pool of agents servicing inbound and outbound telephone calls on a telephone exchange, each agent having a communication device, the system comprising:

a plurality of trunk lines coupled to the telephone exchange and designated as inbound communication lines to receive inbound telephone calls;

a plurality of trunk lines coupled to the telephone exchange and designated as outbound communication lines to place outbound telephone calls;

an automatic call distributor coupled to said inbound communication lines to receive inbound telephone calls from the telephone exchange and couple the inbound telephone calls to the communication devices of a plurality of agents in the agent pool designated as inbound agents, including at least one blend agent, said blend agent being designated to service both inbound and outbound telephone calls as needed;

an outbound dialer coupled to said outbound communication lines to automatically place outbound telephone calls for a plurality of agents in the agent pool designated as outbound agents and for said blend agent when servicing outbound telephone calls;

an acquisition trunk line coupled to said automatic call distributor by a trunk distributor connection and coupled to said outbound dialer by a trunk dialer connection;

acquisition means for acquiring control of the communication device of said blend agent to service an outbound telephone call by using said outbound dialer to place an acquisition telephone call through said acquisition trunk line to said automatic call distributor to acquire control of the communication device of said blend agent and to couple the communication device of couple said acquired blend agent to one of said outbound communication lines via said automatic call distributor and said outbound dialer to service said outbound telephone call; and releasing means for releasing control of the communication device of said acquired blend agent by terminating said acquisition telephone call.

22. A system for dynamically sharing a pool of agents servicing inbound and outbound telephone calls on a telephone exchange, each agent having a communication device, the system comprising:

a plurality of trunk lines coupled to the telephone exchange and designated as inbound communication lines to receive inbound telephone calls;

a plurality of trunk lines coupled to the telephone exchange and designated as outbound communication lines to place outbound telephone calls;

an automatic call distributor coupled to the telephone exchange by said inbound communication lines to receive inbound telephone calls from the telephone exchange and couple the inbound telephone calls to the communication devices of a plurality of agents in the agent pool designated as inbound agents, including at least one blend agent, said blend agent being designated to service both inbound and outbound telephone calls as needed;

an outbound dialer coupled to the telephone exchange by said outbound communication lines to automatically place outbound telephone calls for a plurality of agents in the agent pool designated as outbound agents and for said blend agent when servicing outbound telephone calls;

acquisition means for acquiring control of the communication device of said blend agent to service an outbound telephone call by using said outbound dialer to place an acquisition telephone call on the telephone exchange to said automatic call distributor to acquire control of the communication device of said blend agent and to couple the communication device of said acquired blend agent to one of said outbound communication lines via said automatic call distributor and said outbound dialer to service said outbound telephone call; and releasing means for releasing control of the communication device of said acquired blend agent by terminating said acquisition telephone call.

23. A method of simultaneously maximizing productivity and call servicing quality by sharing a pool of agents using an automatic call distributor and an outbound dialer, both coupled to a telephone exchange and to each other by an acquisition trunk line, each agent having a communication device, the method comprising the steps of:

designating a plurality of agents in the pool of agents as inbound agents to service inbound telephone calls with the communication devices of said inbound agents coupled to a plurality of trunk lines coupled to the telephone exchange and designated as inbound communication lines to receive inbound telephone calls, a plurality of agents in the pool of agents as outbound agents to service outbound telephone calls with the communication devices of said outbound agents coupled to a plurality of trunk lines coupled to the telephone exchange and designated as outbound communication lines to place outbound telephone calls, and at least one agent in the pool of agents as a blend agent to service either inbound or outbound telephone calls with the communication device of said blend agent alternatively coupled to either said inbound communication lines or said outbound communication lines to selectively service either inbound or outbound telephone calls;

determining a level of productivity for said inbound agents, said outbound agents, and said blend agent;

determining a response indicator indicative of a level of service quality;

placing an acquisition telephone call to the communication device of said blend agent who is currently servicing inbound telephone calls using the outbound dialer, the acquisition trunk line, and the automatic call distributor, if said productivity is less than a predetermined productivity goal and said response indicator indicates that said level of service quality exceeds a predetermined service quality goal; and upon connection of said acquisition telephone call to the communication device of said blend agent, acquiring control of the communication device of said blend agent by coupling the communication device of said blend agent to one of said outbound communication lines via the outbound dialer and the automatic call distributor to service said outbound telephone calls.

24. A method of simultaneously maximizing productivity and call servicing quality by sharing a pool of agents using an automatic call distributor and an outbound dialer, both coupled to a telephone exchange, each agent having a communication device, the method comprising the steps of:

designating a plurality of agents in the pool of agents as inbound agents to service inbound telephone calls with the communication devices of said inbound agents coupled to a plurality of trunk lines coupled to the telephone exchange and designated as inbound communication lines to receive inbound telephone calls, a plurality of agents in the pool of agents as outbound agents to service outbound telephone calls with the communication devices of said outbound agents coupled to a plurality of trunk lines coupled to the telephone exchange and designated as outbound communication lines to place outbound telephone calls, and at least one agent in the pool of agents as a blend agent to service either inbound or outbound telephone calls with the communication device of said blend agent alternatively coupled to either said inbound communication lines or said outbound communication lines to selectively service either inbound or outbound telephone calls;

determining a level of productivity for said inbound agents, said outbound agents, and said blend agent;

determining a response indicator indicative of a level of service quality;

placing an acquisition telephone call to the communication device of said blend agent who is currently servicing inbound telephone calls using the outbound dialer to place said acquisition telephone call on the telephone exchange to the automatic call distributor if said productivity is less than a predetermined productivity goal and said response indicator indicates that said level of service quality exceeds a predetermined service quality goal; and upon connection of said acquisition telephone call to the communication device of said blend agent, acquiring control of the communication device of said blend agent by coupling the communication device of said blend agent to one of said outbound communication lines via the outbound dialer and the automatic call distributor to service said outbound telephone calls.

25. A method of dynamically sharing a pool of agents using an automatic call distributor and an outbound dialer, both coupled to a telephone exchange and to each other by an acquisition trunk line, each agent having a communication device, the method comprising the steps of:

designating a plurality of agents in the pool of agents as inbound agents to service inbound telephone calls with the communication devices of said inbound agents coupled to a plurality of trunk lines coupled to the telephone exchange and designated as inbound communication lines to receive inbound telephone calls, a plurality of agents in the pool of agents as outbound agents to service outbound telephone calls with the communication devices of said outbound agents coupled to a plurality of trunk lines coupled to the telephone exchange and designated as outbound communication lines to place outbound telephone calls, and at least one agent in the pool of agents as a blend agent to service either inbound or outbound telephone calls with the communication device of said blend agent alternatively coupled to either said inbound communication lines or said outbound communication lines to selectively service either inbound or outbound telephone calls;

determining a response indicator indicative of a level of service quality;

placing an acquisition telephone call to the communication device of said blend agent who is currently servicing inbound telephone calls using the outbound dialer, the acquisition trunk line, and the automatic call distributor if said response indicator indicates that said level of service quality exceeds a predetermined service quality goal; and upon connection of said acquisition telephone call to the communication device of said blend agent, acquiring control of the communication device of said blend agent by coupling the communication device of said blend agent to one of said outbound communication lines via the outbound dialer and the automatic call distributor to service said outbound telephone calls.

26. A method of dynamically sharing a pool of agents using an automatic call distributor and an outbound dialer, both coupled to a telephone exchange, each agent having a communication device, the method comprising the steps of:

designating a plurality of agents in the pool of agents as inbound agents to service inbound telephone calls with the communication devices of said inbound agents coupled to a plurality of trunk lines coupled to the telephone exchange and designated as inbound communication lines to receive inbound telephone calls, a plurality of agents in the pool of agents as outbound agents to service outbound telephone calls with the communication devices of said outbound agents coupled to a plurality of trunk lines coupled to the telephone exchange and designated as outbound communication lines to place outbound telephone calls, and at least one agent in the pool of agents as a blend agent to service either inbound or outbound telephone calls with the communication device of said blend agent alternatively coupled to either said inbound communication lines or said outbound communication lines to selectively service either inbound or outbound telephone calls;

determining a response indicator indicative of a level of service quality;

placing an acquisition telephone call to the communication device of said blend agent who is currently servicing inbound telephone calls using the outbound dialer to place said acquisition telephone call on the telephone exchange if said response indicator indicates that said level of service quality exceeds a predetermined service quality goal; and upon connection of said acquisition telephone call to the communication device of said blend agent, acquiring control of the communication device of said blend agent by coupling the communication device of said blend agent to one of said outbound communication lines via the outbound dialer and the automatic call distributor to service said outbound telephone calls.

27. A method of dynamically sharing a pool of agents using an automatic call distributor and an outbound dialer, both coupled to a telephone exchange and to each other by an acquisition trunk line, each agent having a communication device, the method comprising the steps of:

designating a plurality of agents in the pool of agents as inbound agents to service inbound telephone calls with the communication devices of said inbound agents coupled to a plurality of trunk lines coupled to the telephone exchange and designated as inbound communication lines to receive inbound telephone calls, a plurality of agents in the pool of agents as outbound agents to service outbound telephone calls with the communication devices of said outbound agents coupled to a plurality of trunk lines coupled to the telephone exchange and designated as outbound communication lines to place outbound telephone calls, and at least one agent in the pool of agents as a blend agent to service either inbound or outbound telephone calls with the communication device of said blend agent alternatively coupled to either said inbound communication lines or said outbound communication lines to selectively service either inbound or outbound telephone calls;

placing an acquisition telephone call to the communication device of said blend agents who is currently servicing inbound telephone calls using the outbound dialer, the acquisition trunk line, and the automatic call distributor; and upon connection of said acquisition telephone call to the communication device of said blend agent, acquiring control of the communication device of said blend agent by coupling the communication device of said blend agent to one of said outbound communication lines via the outbound dialer and the automatic call distributor to service said outbound telephone calls.

28. A method of dynamically sharing a pool of agents using an automatic call distributor and an outbound dialer, both coupled to a telephone exchange, each agent having a communication device, the method comprising the steps of:

designating a plurality of agents in the pool of agents as inbound agents to service inbound telephone calls with the communication devices of said inbound agents coupled to a plurality of trunk lines coupled to the telephone exchange and designated as inbound communication lines to receive inbound telephone calls, a plurality of agents in the pool of agents as outbound agents to service outbound telephone calls with the communication devices of said outbound agents coupled to a plurality of trunk lines coupled to the telephone exchange and designated as outbound communication lines to place outbound telephone calls, and at least one agent in the pool of agents as a blend agent to service either inbound or outbound telephone calls with the communication device of said blend agent alternatively coupled to either said inbound communication lines or said outbound communication lines to selectively service either inbound or outbound telephone calls;

placing an acquisition telephone call to the communication device of said blend agent who is currently servicing inbound telephone calls using the outbound dialer to place said acquisition telephone call on the telephone exchange to the automatic call distributor; and upon connection of said acquisition telephone call to the communication device of said blend agent, acquiring control of the communication device of said blend agent by coupling the communication device of said blend agent to one of said outbound communication lines via the outbound dialer and the automatic call distributor to service said outbound telephone calls.

29. A system for dynamically sharing a pool of agents servicing inbound and outbound telephone calls on a telephone exchange, each agent having a communication device, the system comprising:

a plurality of trunk lines coupled to the telephone exchange and designated as inbound communication lines to receive inbound telephone calls;

a plurality of trunk lines coupled to the telephone exchange and designated as outbound communication lines to place outbound telephone calls;

an automatic call distributor coupled to said inbound communication lines to receive inbound telephone calls from the telephone exchange and couple the inbound telephone calls to the communication devices of a plurality of agents in the agent pool designated as inbound agents, including at least one blend agent, said blend agent being designated to service both inbound and outbound telephone calls as needed;

an outbound dialer coupled to said outbound communication lines to automatically place outbound telephone calls for a plurality of agents in the agent pool designated as outbound agents and for said blend agent when servicing outbound telephone calls;

acquisition means for acquiring control of the communication device of said blend agent to service an outbound telephone call by using said outbound dialer to place an acquisition telephone call on one of said outbound trunk lines through said automatic call distributor to acquire control of the communication device of said blend agent through said automatic call distributor to couple the communication device of said acquired blend agent to an other one of said outbound trunk lines to service said outbound telephone call on said other outbound trunk line; and releasing means for releasing control of the communication device of said acquired blend agent by terminating said acquisition telephone call, whereby control of the communication device of said acquired blend agent is selectively acquired for and released from outbound telephone call servicing by establishing and terminating said acquisition telephone.

30. A system for integrating a telephone call service operation having a stand-alone automatic call distributor and a stand-alone outbound dialer to dynamically share a pool of agents servicing inbound and outbound telephone calls on a telephone exchange, each agent having a communication device, with the automatic call distributor being coupled to a plurality of inbound communication lines coupled to the telephone exchange to receive inbound telephone calls from the telephone exchange and couple the inbound telephone calls to the communication devices of a plurality of agents in the agent pool designated as inbound agents, including a blend agent, said blend agent being designated to service both inbound and outbound telephone calls as needed, and the outbound dialer coupled to a plurality of outbound communication lines coupled to the telephone exchange to place outbound telephone calls for a plurality of agents in the agent pool designated as outbound agents and for said blend agent when servicing outbound telephone calls, the system comprising:

acquisition means for acquiring control of the communication device of the blend agent to service an outbound telephone call by using the outbound dialer to place an acquisition telephone call on one of the plurality of outbound communication lines through the automatic call distributor to acquire control of the communication device of the blend agent through the automatic call distributor to couple the communication device of the acquired blend agent to an other one of the plurality of outbound communication lines to service said outbound telephone call on said other outbound communication line; and releasing means for releasing control of the communication device of the acquired blend agent by terminating said acquisition telephone call.

31. A system for integrating a telephone call service operation having a stand-alone automatic call distributor and a stand-alone outbound dialer to dynamically share a pool of agents servicing inbound and outbound telephone calls on a telephone exchange, each agent having a communication device, with the automatic call distributor being coupled to a plurality of inbound communication lines coupled to the telephone exchange to receive inbound telephone calls from the telephone exchange and couple the inbound telephone calls to the communication devices of a plurality of agents in the agent pool designated as inbound agents, including a blend agent designated to service both inbound and outbound telephone calls as needed, and the outbound dialer being coupled to a plurality of outbound communication lines coupled to the telephone exchange to place outbound telephone calls for a plurality of agents in the agent pool designated as outbound agents and for the blend agent when servicing outbound telephone calls, the system comprising:

acquisition means for acquiring control of the communication device of the blend agent to service an outbound call by establishing a telephone connection between the outbound dialer and the automatic call distributor to acquire control of the communication device of the blend agent through the automatic call distributor to couple the communication device of the acquired blend agent to one of the plurality of outbound communication lines to service said outbound telephone call on said one outbound communication line; and releasing means for releasing control of the communication device of the acquired blend agent by terminating said telephone connection.

32. A system for maximizing productivity by sharing a pool of agents each having a communication device coupled to an automatic call distributor to service inbound telephone calls from a telephone exchange having a plurality of trunk lines designated as inbound communication lines with the automatic call distributor coupled to the inbound communication lines to receive inbound telephone calls from the telephone exchange and to direct the inbound telephone calls to the communication devices of the pool of agents, the automatic call distributor having a computer interface to allow the monitoring of the status of the automatic call distributor, the system comprising:

an analyzer coupled to the automatic call distributor through the computer interface to analyze agent activity related to the inbound telephone calls and to determine a response indicator indicative of a demand level for agent availability for inbound telephone call servicing;

acquisition means for acquiring control of the communication device of one of the plurality of inbound agents to perform alternate service activities other than telephone call servicing, while remaining under the control of the automatic call distributor during a period when said response indicator indicates that said agent demand level is less than a predetermined level, and preventing the automatic call distributor from directing further inbound telephone calls to the communication device of said acquired agent; and releasing means for releasing control of the communication device of said acquired inbound agent if said response indicator indicates that said agent demand level is greater than said predetermined level, and allowing the automatic call distributor to direct further inbound telephone calls to the communication device of said released agent.

33. The system of claim 32 wherein said analyzer compiles a set of statistics related to said agent activity and uses said compiled statistics to measure said agent demand.

34. The system of claim 33 wherein said compiled statistics include a wrap-up time required by the pool of agents to process data after termination of telephone calls, said analyzer determining said wrap-up time based on a measured wrap-up time and an imputed wrap-up time whenever said measured wrap-up time is not available, said imputed wrap-up time being a fraction of said measured wrap-up time.

35. The system of claim 33 wherein said compiled statistics include the number of agents available to service the telephone calls, said analyzer determining the number of said available agents by comparing a work time for a particular one of the pool of agents with an average work time and declaring said particular agent unavailable if said work time for said particular agent exceeds said average work time by a predetermined amount.

36. The system of claim 32 wherein said computer interface is a computer-telephone integration link.

* * * * *

UNITED STATES PATENT AND TRADEMARK OFFICE
CERTIFICATE OF CORRECTION

PATENT NO.    : 5,467,391
DATED         : November 14, 1995
INVENTOR(S)   : Norman J. Donaghue, Jr. et al.

It is certified that error appears in the above identified patent and that said Letters Patent is hereby corrected as shown below:

In column 22, claim 21, line 17, delete "couple."

In column 25, claim 27, line 57, delete "agents" and substitute therefor --agent--.

In column 27, claim 29, line 12, following "telephone" insert --call--.

Signed and Sealed this

Thirtieth Day of April, 1996

Attest:

BRUCE LEHMAN

*Attesting Officer*     *Commissioner of Patents and Trademarks*